(12) United States Patent
Tsubouchi et al.

(10) Patent No.: US 10,815,047 B2
(45) Date of Patent: Oct. 27, 2020

(54) CHEMILUMINESCENT AEROSOL PRODUCT

(71) Applicants: LUMICA CORPORATION, Fukuoka (JP); TOYO AEROSOL INDUSTRY CO., LTD., Tokyo (JP)

(72) Inventors: Makoto Tsubouchi, Tokyo (JP); Keisuke Koshizuka, Tokyo (JP); Yasutomo Nakajima, Tokyo (JP); Shinichi Tsunoda, Tokyo (JP); Masaya Ito, Fukuoka (JP); Shiro Harada, Fukuoka (JP)

(73) Assignees: LUMICA CORPORATION, Fukuoka (JP); TOYO AEROSOL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/353,348

(22) Filed: Mar. 14, 2019

(65) Prior Publication Data
US 2019/0210792 A1    Jul. 11, 2019

Related U.S. Application Data

(63) Continuation of application No. PCT/JP2016/077227, filed on Sep. 15, 2016.

(51) Int. Cl.
*B65D 83/68* (2006.01)
*C09K 3/30* (2006.01)
(Continued)

(52) U.S. Cl.
CPC .......... *B65D 83/682* (2013.01); *B01F 3/0861* (2013.01); *B01F 5/0617* (2013.01);
(Continued)

(58) Field of Classification Search
CPC .. B65D 83/682; B65D 83/66; B65D 81/3238; B65D 83/68; B65D 83/60; C09K 11/025;
(Continued)

(56) References Cited

U.S. PATENT DOCUMENTS 3,671,450 A * 6/1972 Rauhut .................. C09K 11/07
252/700
7,090,790 B2    8/2006 Park et al.
(Continued)

FOREIGN PATENT DOCUMENTS

EP    2349912 B1    7/2014
JP    2001286794 A    10/2001
(Continued)

OTHER PUBLICATIONS

International Search Report dated Dec. 20, 2016 for PCT/JP2016/077227 and English translation.
(Continued)

*Primary Examiner* — David P Angwin
*Assistant Examiner* — Bob Zadeh
(74) *Attorney, Agent, or Firm* — Lucas & Mercanti, LLP

(57) ABSTRACT

The object of present invention is to provide a chemiluminescent aerosol product that can easily form an expected quantity of a chemiluminescent composition which exhibits excellent storage stability, is stably self-held for a long period of time and achieves a good luminous effect.

This aerosol product includes a double-structure container provided with a discharging mechanism for simultaneously discharging contents filled in two liquid concentrate filling spaces. A propellant filling space is filled with a propellant composed of a compressed gas, a first liquid concentrate filling space is filled with a first liquid concentrate composition containing an oxalic acid ester, a fluorescent substance and a thickener, and having a viscosity of 10,000-200,000 mPa·s (20° C.), and a second liquid concentrate filling space is filled with a second liquid concentrate composition containing hydrogen peroxide, a hydrogen peroxide decomposition catalyst and a thickener, and having a viscosity of 10,000-200,000 mPa·s (20° C.). The discharging mechanism includes a mixture discharging member having mixer for mixing the two kinds of liquid concentrate compositions. The two kinds of liquid concentrate compositions are mixed to form a chemiluminescent composition.

6 Claims, 4 Drawing Sheets

(51) Int. Cl.
  *C09K 11/07* (2006.01)
  *B01F 3/08* (2006.01)
  *B01F 5/06* (2006.01)
  *B65D 81/32* (2006.01)
  *B65D 83/66* (2006.01)
  *C09K 11/02* (2006.01)

(52) U.S. Cl.
  CPC ......... *B65D 81/3238* (2013.01); *B65D 83/66* (2013.01); *C09K 3/30* (2013.01); *C09K 11/025* (2013.01); *C09K 11/07* (2013.01); *B01F 2215/0093* (2013.01); *C09K 2211/1011* (2013.01)

(58) Field of Classification Search
  CPC ... C09K 11/07; C09K 3/30; C09K 2211/1011; B01F 5/0617; B01F 3/0861; B01F 2215/0093
  See application file for complete search history.

(56) References Cited

U.S. PATENT DOCUMENTS

| | | | | |
|---|---|---|---|---|
| 7,255,874 | B1* | 8/2007 | Bobo | A61K 9/5026 424/450 |
| 9,303,820 | B2* | 4/2016 | Miller | B05B 7/0408 |
| 2001/0053440 | A1* | 12/2001 | Colley | D04H 13/00 428/292.1 |
| 2005/0276716 | A1* | 12/2005 | Campbell | C22C 1/0433 419/13 |
| 2006/0214141 | A1* | 9/2006 | Yankielun | C09D 5/22 252/583 |
| 2009/0175915 | A1* | 7/2009 | Maitra | A61K 8/0241 424/401 |
| 2010/0091478 | A1* | 4/2010 | Miller | B05B 11/0078 362/34 |
| 2012/0076930 | A1 | 3/2012 | Miller | |
| 2014/0371342 | A1* | 12/2014 | Drechsler | A61K 6/891 523/116 |
| 2016/0116814 | A1* | 4/2016 | Teranishi | G02F 1/167 359/296 |
| 2018/0035780 | A1 | 2/2018 | Nakajima et al. | |
| 2019/0210792 | A1* | 7/2019 | Tsubouchi | B01F 3/0861 |

FOREIGN PATENT DOCUMENTS

| | | |
|---|---|---|
| JP | 2016160186 A | 9/2016 |
| WO | 2014069343 A1 | 5/2014 |

OTHER PUBLICATIONS

EPO, Extended European Search Report for the corresponding European patent application No. 16916232.8, dated Nov. 19, 2019.

* cited by examiner

CHEMILUMINESCENT AEROSOL PRODUCT

CROSS REFERENCE TO RELATED APPLICATIONS

This application is a continuation of PCT/JP2016/077227 filed on Sep. 15, 2016, which is incorporated herein by reference.

TECHNICAL FIELD

The present invention relates to a chemiluminescent aerosol product, and more particularly to a chemiluminescent aerosol product by which a chemiluminescent composition is obtained as a discharged material.

BACKGROUND ART

As a chemiluminescent composition used as a chemical light or the like, a conventionally known composition comprises a fluorescent liquid composition containing an oxalic acid ester and a fluorescent substance, and an oxidation liquid composition containing hydrogen peroxide and, if necessary, a hydrogen peroxide decomposition catalyst. When these two compositions are used, they are mixed to obtain the luminescence performance by a chemical reaction occurring in a mixed system of the oxalic acid ester, hydrogen peroxide, and fluorescent substance.

As a chemical light using such a chemiluminescent composition, there is a chemical light in which a rod-shaped glass ampoule in which one composition of the fluorescent liquid composition and the oxidation liquid composition is enclosed is sealed in a single tube made of a transparent plastic having a larger diameter and a longer length than the glass ampoule, together with the other composition. The chemical light is one-time-use. In using the chemical light, the single tube is bent to crack the glass ampoule in the single tube to mix the fluorescent liquid composition and the oxidation liquid composition.

In the chemical light having such a structure, the chemiluminescent composition is likely to deteriorate by ultraviolet rays or moisture. For this reason, it is necessary to accommodate the composition together with a desiccant in a storage bag made of aluminum for storage, and therefore, the storage method becomes complicated. In addition, there is a problem that the glass ampoule may be damaged by being subjected to an external impact during storage (in particular, during transportation).

On the other hand, it has been proposed that the fluorescent liquid composition and the oxidation liquid composition are accommodated in a container in a state where they are separated from each other (for example, see Patent Literature 1 to Patent Literature 3).

Specifically, in Patent Literatures 1 to 3, aerosol products have been proposed in which a fluorescent liquid composition and an oxidation liquid composition are filled in a two-liquid mixing type aerosol container in a state where they are separated from each other. In these Patent Literatures 1 to 3, it is preferable that the discharged material of the aerosol product is in the form of a mist, or in the form of a liquid or a mist.

However, since the fluorescent liquid composition and the oxidation liquid composition in these aerosol products have a low viscosity in order to obtain a discharged material in the form of a mist or in the form of a liquid, there is a problem that liquid dripping tends to occur at the application site. Furthermore, since the film thickness of the film body formed by the discharged material at the application site is small, there is a problem that it is difficult to obtain sufficient luminance in the film body.

In addition, there has been proposed, as a container for accommodating a fluorescent liquid composition and an oxidation liquid composition in a state where they are separated from each other, a container including a cylinder filled with the fluorescent liquid composition and the oxidation liquid composition in a state where they are separated from each other, and a common piston for extruding the fluorescent liquid composition and the oxidation liquid composition filled in the cylinder (see, for example, Patent Literature 4). The fluorescent liquid composition and the oxidation liquid composition filled in the cylinder of the container are mixed in the process of being extruded by the common piston. Thus, the chemiluminescent composition is extruded from the container. Since the fluorescent liquid composition and the oxidation liquid composition each contain a thickener, the chemiluminescent composition extruded from the container has a high viscosity. Therefore, the film thickness of the film body formed by the extrudate at the application site can be increased.

However, the amount of extrudate must be adjusted by the amount of movement of the piston. Therefore, there is a problem that it is difficult to obtain the chemiluminescent composition in a desired amount. In addition, since the piston is moved by a human hand, the pressure distribution of the fluorescent liquid composition and the oxidation liquid composition applied by the piston tends to be uneven. When the pressure distribution becomes uneven, the fluorescent liquid composition and the oxidation liquid composition cannot be mixed at a constant amount ratio. Therefore, there is a problem that the chemiluminescent composition having a desired composition cannot be obtained, and a desired luminance cannot be obtained in the chemiluminescent composition formed.

CITATION LIST

Patent Literature

Patent Literature 1: Japanese Patent Application Laid-Open No. 2001-286794
Patent Literature 2: European Patent No. 2349912
Patent Literature 3: U.S. Patent Application Publication No. 2012/0076930
Patent Literature 4: Pamphlet of International Publication No. 2014/069343

SUMMARY OF INVENTION

Technical Problem

The present invention has been made in view of the foregoing circumstances, and has as its object the provision of a chemiluminescent aerosol product which is capable of easily forming a chemiluminescent composition in a desired amount so that the chemiluminescent composition has excellent storage stability, is stably self-held for a long period of time, and can exert a good luminescent effect.

Solution to Problem

The chemiluminescent aerosol product of the present invention includes a double-structure container having a propellant filling space and two independent liquid concentrate filling spaces, and provided with a discharging mechanism for simultaneously discharging contents filled in the two liquid concentrate filling spaces, wherein the propellant filling space in the double-structure container is filled with a propellant composed of a compressed gas, a first liquid concentrate filling space of the liquid concentrate filling spaces in the double-structure container is filled with a first liquid concentrate composition, and a second liquid concentrate filling space of the liquid concentrate filling spaces in the double-structure container is filled with a second liquid concentrate composition, the first liquid concentrate composition contains an oxalic acid ester, a fluorescent substance and a thickener, and has a viscosity of 10,000 to 200,000 mPa·s at a temperature of 20° C., the second liquid concentrate composition contains hydrogen peroxide, a hydrogen peroxide decomposition catalyst and a thickener, and has a viscosity of 10,000 to 200,000 mPa·s at a temperature of 20° C., the discharging mechanism includes a mixture discharging member having mixer for mixing the first liquid concentrate composition from the first liquid concentrate filling space and the second liquid concentrate composition from the second liquid concentrate filling space, and the first liquid concentrate composition and the second liquid concentrate composition are mixed to form a chemiluminescent composition.

In the chemiluminescent aerosol product of the present invention, the first liquid concentrate composition may preferably contain 3 to 25% by mass of the oxalic acid ester, 0.1 to 0.5% by mass of the fluorescent substance, 3 to 10% by mass of the thickener and a solvent, and the second liquid concentrate composition may preferably contain 1 to 5% by mass of hydrogen peroxide, 0.02% by mass or less of the hydrogen peroxide decomposition catalyst, 3 to 10% by mass of the thickener and a solvent.

In the chemiluminescent aerosol product of the present invention, the thickener in the first liquid concentrate composition and the thickener in the second liquid concentrate composition may preferably be a fumed silica.

In the chemiluminescent aerosol product of the present invention, the first liquid concentrate composition and the second liquid concentrate composition may preferably each have a viscosity falling within ±20% of an average value of the viscosity of the first liquid concentrate composition and the viscosity of the second liquid concentrate composition.

In the chemiluminescent aerosol product of the present invention, the mixer may preferably be a static mixer.

Advantageous Effects of Invention

A chemiluminescent aerosol product of the present invention includes a double-structure container provided with a discharging mechanism for simultaneously discharging the contents filled in two liquid concentrate filling spaces, and the discharging mechanism includes a mixture discharging member having mixer for mixing the contents from the two liquid concentrate filling spaces. One of the two liquid concentrate filling spaces is filled with a first liquid concentrate composition containing an oxalic acid ester and a fluorescent substance and having a specific viscosity. The other of them is filled with a second liquid concentrate composition containing hydrogen peroxide and a hydrogen peroxide decomposition catalyst and having a specific viscosity. Therefore, since the first liquid concentrate composition and the second liquid concentrate composition are not exposed to an environmental atmosphere outside the container and ultraviolet rays, storage stability can be obtained.

Furthermore, since the first liquid concentrate composition and the second liquid concentrate composition can be simultaneously discharged from the respective two liquid concentrate filling spaces in the double-structure container in respective appropriate amounts, the first liquid concentrate composition and the second liquid concentrate composition can always be mixed at a constant amount ratio. Thus, the discharge amount of one liquid concentrate composition does not become excessive compared to the discharge amount of the other liquid concentrate composition.

Therefore, the chemiluminescent aerosol product of the present invention can easily form a chemiluminescent composition in a desired amount so that the chemiluminescent composition has excellent storage stability, is stably self-held for a long period of time, and can exert a good luminescent effect.

DESCRIPTION OF EMBODIMENTS

Figure 1:
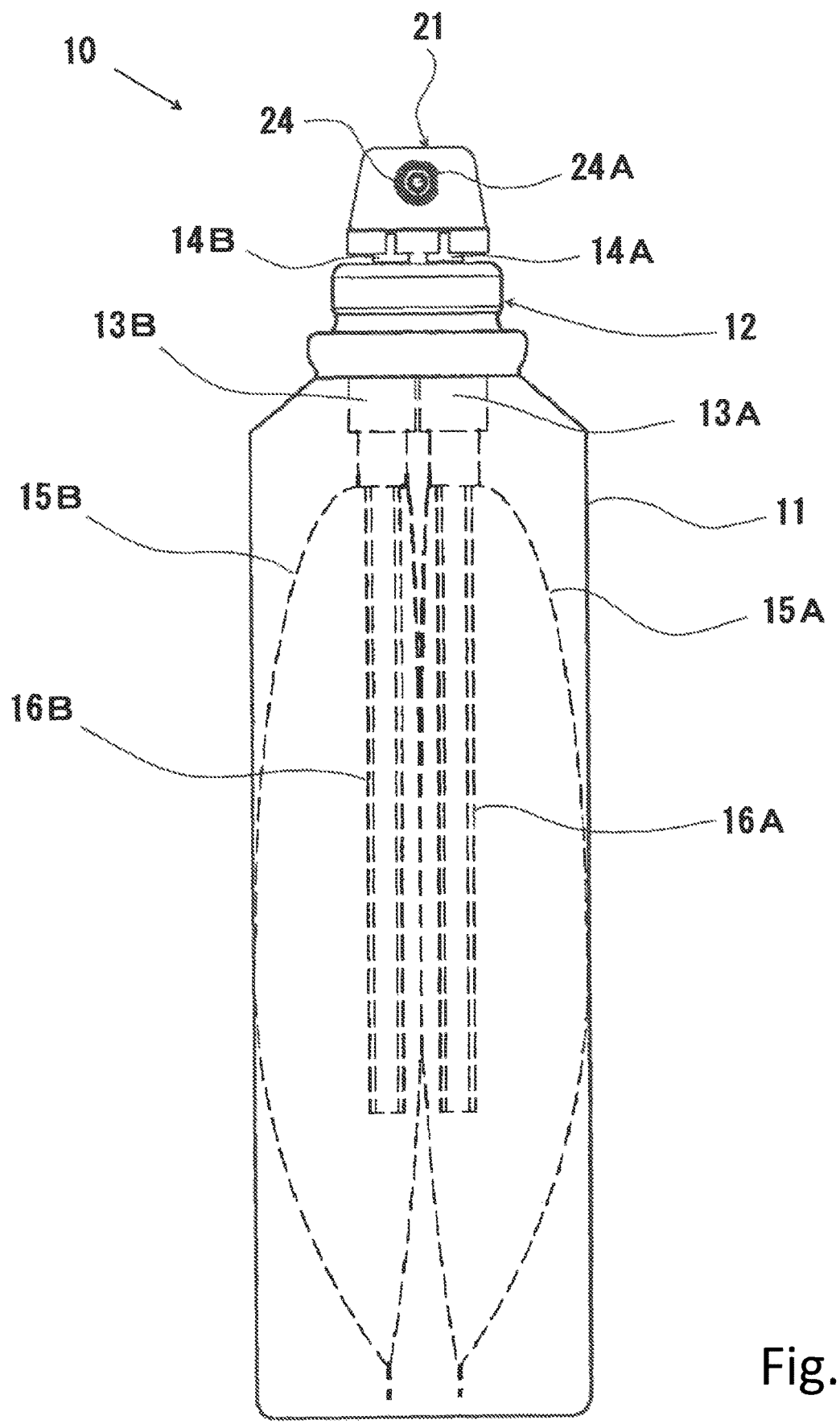
FIG. 1 is an explanatory view illustrating an example of a configuration of a double-structure container used for a chemiluminescent aerosol product of the present invention.

A chemiluminescent aerosol product of the present invention includes a double-structure container which has a propellant filling space and two independent liquid concentrate filling spaces, and which is provided with a discharging mechanism for simultaneously discharging contents filled in the two liquid concentrate filling spaces. In the dual structure container, the discharging mechanism includes a mixture discharging member having mixer for mixing the contents from the two liquid concentrate filling spaces. In the double-structure container, the propellant filling space is filled with a propellant composed of a compressed gas. A first liquid concentrate filling space is filled with a first liquid concentrate composition containing an oxalic acid ester and a fluorescent substance. A second liquid concentrate filling space is filled with a second liquid concentrate composition containing hydrogen peroxide.

In the chemiluminescent aerosol product of the present invention, the first liquid concentrate composition and the second liquid concentrate composition, which are to be simultaneously discharged from the first liquid concentrate filling space and the second liquid concentrate filling space, are mixed to form a chemiluminescent composition. In this chemiluminescent composition, luminescence performance is obtained by a chemical reaction occurring in a mixed system of the oxalic acid ester, hydrogen peroxide, and the fluorescent substance.

First Liquid Concentrate Composition:

The first liquid concentrate composition is a liquid containing an oxalic acid ester, a fluorescent substance and a thickener as essential components.

The first liquid concentrate composition may preferably contain an oxalic acid ester, a fluorescent substance, a thickener and a solvent.

Examples of the oxalic acid ester which is an essential component of the first liquid concentrate composition include diphenyl oxalate compounds such as bis(2,4,5- trichloro-6-carbobutoxyphenyl)oxalate, bis(2,4,5-trichloro-6-carboisopentyloxyphenyl)oxalate, bis(6-(butylmonoglycoxycarbonyl)-2,4,5-trichlorophenyl)oxalate and bis(2,4,5-trichloro-6-carbopentoxyphenyl)oxalate (CPPD).

The content ratio of the oxalic acid ester may preferably be 3 to 25% by mass, more preferably 8 to 20% by mass, per 100% by mass of the first liquid concentrate composition.

If the content ratio of the oxalic acid ester is too high, the luminescence performance (in particular, luminance and luminescence time) of the chemiluminescent composition formed may be in excess of the intended luminescence performance.

On the other hand, if the content ratio of the oxalic acid ester is too low, good luminescence performance (specifically, desired luminance and luminescence time) may not be obtained in the chemiluminescent composition formed.

As the fluorescent substance which is an essential component of the first liquid concentrate composition, an organic fluorescent substance such as a fluorescent anthracene compound and a fluorescent perylene compound is used.

Specific examples of the fluorescent anthracene compounds include 9,10-bis(4-methoxyphenyl)-2-chloroanthracene, 9,10-diphenylanthracene, bisphenylethynyl anthracene (BPEA), 2-ethyl-bisphenylethynyl anthracene (2-EtBPEA), 1,8-dichloro-bisphenylethynyl anthracene (1,8-dcBPEA), diphenylanthracene, 1-chloro-bisphenylethynyl anthracene (1-cBPEA) and 2-chloro-bismethoxyphenyl anthracene (2-cBPEA).

Specific examples of the fluorescent perylene compound include 1,6,7,12-tetraphenoxy-N,N'-bis(2,6-diisopropylphenyl)-3,4,9,10-perylenedicarboximide.

These compounds are selectively used as appropriate in accordance with the use application and the like of the chemiluminescent aerosol product of the present invention.

The content ratio of the fluorescent substance may preferably be 0.1 to 0.50% by mass, more preferably 0.1 to 0.30% by mass, per 100% by mass of the first liquid concentrate composition.

If the content ratio of the fluorescent substance is too high and too low, there is a possibility that good luminescence performance (specifically, desired luminance and luminescence time) cannot be obtained in the chemiluminescent composition formed in either case.

As the thickener which is an essential component of the first liquid concentrate composition, it is preferable to use a fumed silica. In this specification, the "fumed silica" refers to a dry silica that is a silicon oxide powder particle obtained by a flame hydrolysis method, an arc method, a plasma method, or the like, and is a concept including those with a surface having been subjected to a hydrophobic treatment.

In the first liquid concentrate composition, hydrophobic fumed silica with a surface having been subjected to a hydrophobic treatment is suitably used.

Use of such a fumed silica as the thickener can provide a thickening effect without impairing the stability of the first liquid concentrate composition. In particular, the use of a hydrophobic fumed silica as the fumed silica can prevent an increase in the amount of water in the liquid of the first liquid concentrate composition.

When a fumed silica is used as the thickener in the first liquid concentrate composition, the average particle size (primary particle size) of the fumed silica may preferably be not greater than 20 nm.

When the average particle size of the fumed silica is set to not greater than 20 nm, occurrence of clogging in an aerosol valve can be prevented, and the fumed silica can be stably dispersed in the first liquid concentrate composition.

As the thickener, silica other than fumed silica and other thickeners may also be used.

The content ratio of the thickener may preferably be 3 to 10% by mass, more preferably 6 to 9% by mass, per 100% by mass of the first liquid concentrate composition.

If the content ratio of the thickener is too high, a large difference occurs between the discharge amount of the first liquid concentrate composition and the discharge amount of the second liquid concentrate composition, so that good luminescence performance (specifically, desired luminance and luminescence time) may not be obtained in the chemiluminescent composition formed. In addition, the yield at the time of manufacturing may be lowered to become impractical.

On the other hand, if the content ratio of the thickener is too low, dripping may occur at the application site. Further, a large difference occurs between the discharge amount of the first liquid concentrate composition and the discharge amount of the second liquid concentrate composition, and thus, good luminescence performance (specifically, desired luminance and luminescence time) and self-holding action may not be obtained in the chemiluminescent composition formed.

Examples of the solvent used in the first liquid concentrate composition include organic solvents such as phthalate esters (specifically, dibutyl phthalate, etc.), citrate esters (specifically, tributyl citrate, triethyl citrate, etc.), benzyl benzoate, butyl benzoate, acetyl citrate, di(propylene glycol) dimethyl ether and di(ethylene glycol)diethyl ether. These may be used either singly or in any combination of two or more of them.

The content ratio of the organic solvent may preferably be not less than 80.0% by mass per 100% by mass of the first liquid concentrate composition from the viewpoint of the relationship with the content ratios of other constituent components.

The first liquid concentrate composition may contain other components as necessary in addition to the oxalic acid ester, the fluorescent substance, the thickener and the solvent.

The first liquid concentrate composition as described above has a viscosity at a temperature of 20° C. of 10,000 to 200,000 mPa·s, which may preferably be 10,000 to 150,000 mPa·s.

If the viscosity of the first liquid concentrate composition is too high, discharge becomes difficult. In addition, an intended discharge amount thereof in relation to the discharge amount of the second liquid concentrate composition may not be obtained.

On the other hand, if the viscosity of the first liquid concentrate composition is too low, dripping may occur at the application site.

The viscosity of the first liquid concentrate composition may preferably fall within a range of ±20%, more preferably within a range of ±15%, of the average value of the viscosity of the first liquid concentrate composition and the viscosity of the second liquid concentrate composition (hereinafter also referred to as "viscosity average value") from the relationship with the viscosity of the second liquid concentrate composition, which will be described later.

If the viscosity of the first liquid concentrate composition is out of the foregoing range with respect to the viscosity average value, that is, if it exceeds ±20% of the viscosity average value, the difference between the discharge amount of the first liquid concentrate composition discharged from the first liquid concentrate filling space and the discharge amount of the second liquid concentrate composition discharged from the second liquid concentrate filling space becomes large. Therefore, good luminescence performance (specifically, desired luminance and luminescence time) may not be obtained in the chemiluminescent composition formed. In addition, the first liquid concentrate composition and the second liquid concentrate composition may not be sufficiently mixed by the mixer of the mixture discharging member (specifically, the static mixer) provided in the discharging mechanism constituting the double-structure container.

Second Liquid Concentrate Composition:

The second liquid concentrate composition is a liquid containing hydrogen peroxide, a hydrogen peroxide decomposition catalyst and a thickener as essential components.

The second liquid concentrate composition may preferably contain hydrogen peroxide, a hydrogen peroxide decomposition catalyst, a thickener and a solvent.

The content ratio of hydrogen peroxide, which is an essential component of the second liquid concentrate composition, may preferably be 1 to 5% by mass, more preferably 2 to 4% by mass, per 100% by mass of the second liquid concentrate composition.

If the content ratio of hydrogen peroxide is too high and too low, good luminescence performance (specifically, desired luminance and luminescence time) may not be obtained in the chemiluminescent composition formed in either case.

Examples of the hydrogen peroxide decomposition catalyst used, which is an essential component of the second liquid concentrate composition, include tetrabutylammonium salicylate (TBAS), sodium salicylate (SS), ammonium salicylate (AS) and sodium benzoate.

The content ratio of the hydrogen peroxide decomposition catalyst may preferably be not more than 0.02% by mass, more preferably 0.005 to 0.02% by mass, per 100% by mass of the second liquid concentrate composition.

If the content ratio of the hydrogen peroxide decomposition catalyst is too high, excessive luminescence performance (specifically, luminance and luminescence time) may be exerted in the chemiluminescent composition formed.

As the thickener which is an essential component of the second liquid concentrate composition, it is preferable to use a fumed silica.

In the second liquid concentrate composition, a hydrophilic fumed silica is suitably used.

When a fumed silica is used as the thickener in the second liquid concentrate composition, the average particle size (primary particle size) of the fumed silica may preferably be not greater than 20 nm.

When the average particle size of the fumed silica is set to not greater than 20 nm, occurrence of clogging in an aerosol valve can be prevented, and the fumed silica can be stably dispersed in the second liquid concentrate composition.

As the thickener, silica other than the fumed silica and other thickeners may also be used.

The content ratio of the thickener may preferably be 3 to 10% by mass, more preferably 6 to 9% by mass, per 100% by mass of the second liquid concentrate composition.

If the content ratio of the thickener is too high, a large difference occurs between the discharge amount of the first liquid concentrate composition and the discharge amount of the second liquid concentrate composition, so that good luminescence performance (specifically, desired luminance and luminescence time) and self-holding action may not be obtained in the chemiluminescent composition formed.

On the other hand, if the content ratio of the thickener is too low, dripping may occur at the application site. Further, a large difference occurs between the discharge amount of the first liquid concentrate composition and the discharge amount of the second liquid concentrate composition, and thus, good luminescence performance (specifically, desired luminance and luminescence time) and self-holding action may not be obtained in the chemiluminescent composition formed.

In the second liquid concentrate composition, the organic solvent exemplified as the solvent used in the first liquid concentrate composition may be used as the solvent.

The content ratio of the organic solvent may preferably be not less than 90.0% by mass per 100% by mass of the second liquid concentrate composition from the viewpoint of the relationship with the content ratios of other constituent components.

The second liquid concentrate composition may contain other components as necessary in addition to hydrogen peroxide, the hydrogen peroxide decomposition catalyst, the thickener and the solvent.

The second liquid concentrate composition as described above has a viscosity at a temperature of 20° C. of 10,000 to 200,000 mPa·s, which may preferably be 10,000 to 150,000 mPa·s.

If the viscosity of the second liquid concentrate composition is too high, discharge becomes difficult. In addition, an intended discharge amount thereof in relation to the discharge amount of the first liquid concentrate composition may not be obtained.

On the other hand, if the viscosity of the second liquid concentrate composition is too low, dripping may occur at the application site.

The viscosity of the second liquid concentrate composition may preferably fall within a range of ±20%, more preferably within a range of ±15%, of the average value of the viscosity of the first liquid concentrate composition and the viscosity of the second liquid concentrate composition ("viscosity average value") from the relationship with the viscosity of the first liquid concentrate composition, as described above.

If the viscosity of the second liquid concentrate composition is out of the foregoing range with respect to the viscosity average value, that is, if it exceeds ±20% of the viscosity average value, the difference between the discharge amount of the first liquid concentrate composition discharged from the first liquid concentrate filling space and the discharge amount of the second liquid concentrate composition discharged from the second liquid concentrate filling space becomes large. Therefore, good luminescence performance (specifically, desired luminance and luminescence time) may not be obtained in the chemiluminescent composition formed. In addition, the first liquid concentrate composition and the second liquid concentrate composition may not be sufficiently mixed by the mixer of the mixture discharging member (specifically, the static mixer) provided in the discharging mechanism constituting the double-structure container.

Propellant:

A compressed gas is used as the propellant.

Examples of the compressed gas include nitrogen gas, nitrous oxide gas, carbon dioxide gas and a mixed gas thereof.

The propellant is not discharged from the propellant filling space to the outside of the double-structure container along with simultaneous discharge of the first liquid concentrate composition and the second liquid concentrate composition.

The propellant may preferably be sealed so that the pressure applied when being filled in the double-structure container is 0.3 to 1.2 MPa at 25° C.

If the pressure of the propellant applied when being filled (product internal pressure) is too high and too low, the contents may not be ejected in a good ejection state in either case.

Double-Structure Container:

The double-structure container constituting the chemiluminescent aerosol product of the present invention has the first liquid concentrate filling space to be filled with the first liquid concentrate composition and the second liquid concentrate filling space to be filled with the second liquid concentrate composition, together with the propellant filling space to be filled with the propellant. The double-structure container is provided with the discharging mechanism for simultaneously discharging the first liquid concentrate composition and the second liquid concentrate composition from the first liquid concentrate filling space and the second liquid concentrate filling space, respectively. The discharging mechanism includes the mixture discharging member having the mixer for mixing the first liquid concentrate composition from the first liquid concentrate filling space and the second liquid concentrate composition from the second liquid concentrate filling space. The mixture discharging member is configured to discharge a mixture of the first liquid concentrate composition from the first liquid concentrate filling space and the second liquid concentrate composition from the second liquid concentrate filling space.

Specific examples of the double-structure container according to the present invention include the following container illustrated in FIG. 1 to FIG. 4.

Figure 2:
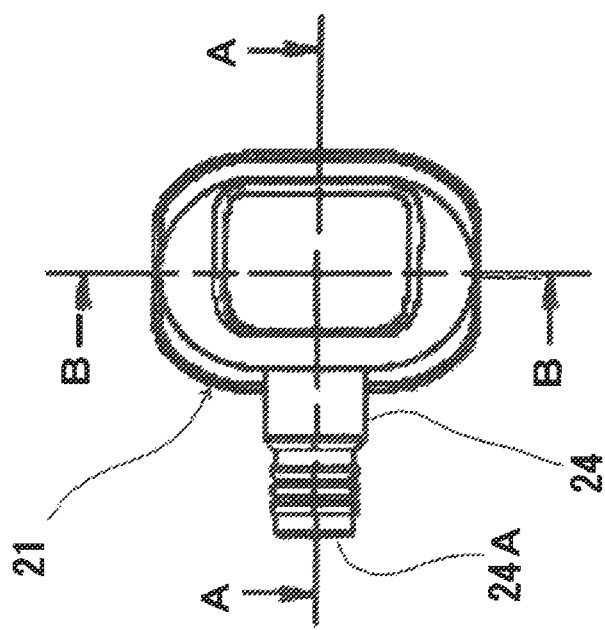
FIG. 2 is an explanatory plan view of an actuator in the double-structure container of FIG. 1 as seen from above.
Figure 3:
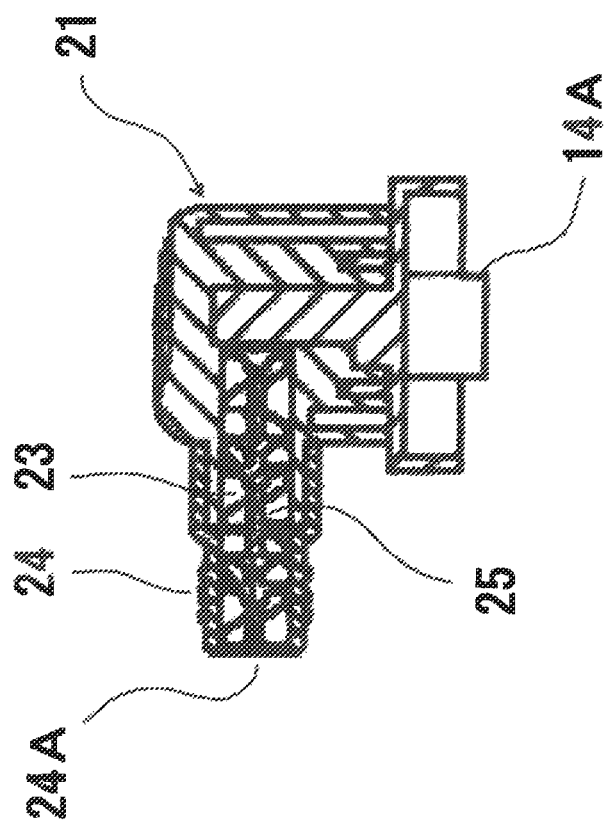
FIG. 3 is an explanatory cross-sectional view illustrating a cross section taken along line A-A of FIG. 2.
Figure 4:
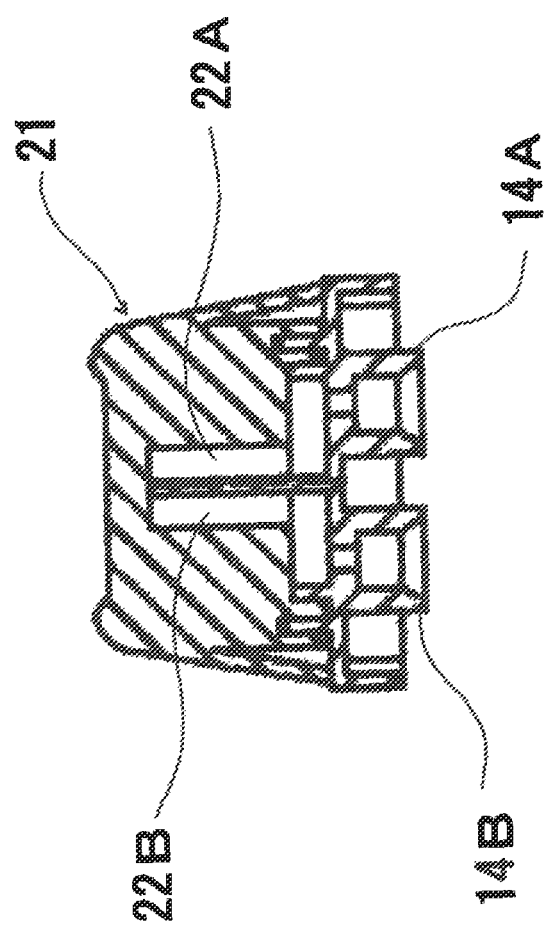
FIG. 4 is an explanatory cross-sectional view illustrating a cross section taken along line B-B of FIG. 2.

FIG. 1 is an explanatory view illustrating an example of a configuration of a double-structure container used for the chemiluminescent aerosol product of the present invention. FIG. 2 is an explanatory plan view of an actuator in the double-structure container of FIG. 1 as seen from above, FIG. 3 is an explanatory cross-sectional view illustrating a cross section taken along line A-A of FIG. 2, and FIG. 4 is an explanatory cross-sectional view illustrating a cross section taken along line B-B of FIG. 2.

The double-structure container 10 includes a pressure-resistant container 11 made of metal and provided with an aerosol valve 12. The pressure-resistant container 11 is provided thereinside with a first inner bag 15A which is formed of, for example, an aluminum laminate film and defines the first liquid concentrate filling space to be filled with the first liquid concentrate composition, and a second inner bag 15B which is formed of, for example, an aluminum laminate film and defines the second liquid concentrate filling space to be filled with the second liquid concentrate composition. The propellant filling space to be filled with the propellant is formed in a gap between the pressure-resistant container 11 and the first inner bag 15A and the second inner bag 15B. The aerosol valve 12 is provided with a first stem or a second stem which has a stem passage inside each of the first housing 13A and the second housing 13B and is disposed movably in the vertical direction. A common actuator 21 is provided at the upper end of the first stem and the second stem.

In the example illustrated in the figure, a reference character 14A denotes a stem connection relating to the first stem and 14B a stem connection relating to the second stem. A reference character 16A denotes a first dip tube which is in communication with the stem passage of the first stem at the lower end of the first housing 13A and extends toward the bottom of the pressure-resistant container 11 in the first inner bag 15A. A reference character 16B denotes a second dip tube which is in communication with the stem passage of the second stem at the lower end of the second housing 13B and extends toward the bottom of the pressure-resistant container 11 in the second inner bag 15B.

In FIG. 1, components located inside the pressure-resistant container 11 are indicated by broken lines.

The common actuator 21 is provided with a first actuator passage 22A in communication with the stem passage of the first stem, a second actuator passage 22B in communication with the stem passage of the second stem, and a cylindrical mixing space 23 in communication with the first actuator passage 22A and the second actuator passage 22B at one end thereof and with a discharge port 24A of a nozzle forming member 24 at the other end thereof. The mixing space 23 is provided with the mixer 25 for mixing the first liquid concentrate composition and the second liquid concentrate composition, and the mixing space 23 is thus provided with the mixer 25 to constitute the mixture discharging member. As the mixer 25, a static mixer is suitably used. The static mixer is formed by alternately arranging a right-handed spiral element (hereinafter, also referred to as a "right element") and a left-handed spiral element (hereinafter, also referred to as a "left element") in a row.

By providing the actuator 21 common to the first stem relating to the first inner bag 15A and the second stem relating to the second inner bag 15B, the discharging mechanism for simultaneously discharging the first liquid concentrate composition filled in the first inner bag 15A and the second liquid concentrate composition filled in the second inner bag 15B from the first inner bag 15A and the second inner bag 15B is formed.

In the example illustrated in the drawing, a static mixer is used as the mixer 25, and the static mixer has a total of five elements composed of right elements in which a rectangular plate is twisted in the right direction and left elements in which a rectangular plate is twisted in the left direction.

In the double-structure container 10 having such a configuration, the first inner bag 15A is filled with the first liquid concentrate composition, the second inner bag 15B is filled with the second liquid concentrate composition, and the propellant filling space is filled with the propellant, so that the inside of the pressure-resistant container 11 is always pressurized by the propellant. Therefore, when the actuator 21 is operated (depressed), the pressure of the propellant contracts the first inner bag 15A and the second inner bag 15B, whereby the first liquid concentrate composition and the second liquid concentrate composition are simultaneously discharged from of the first inner bag 15A and the second inner bag 15B, respectively. As a result, the mixture of the first liquid concentrate composition and the second liquid concentrate composition is discharged from the discharge port 24A.

Specifically, in the double-structure container 10 filled with the first liquid concentrate composition, the second liquid concentrate composition, and the propellant, when the actuator 21 is not operated or depressed, the first stem and the second stem are pushed upward to shut off the stem passage of the first stem and the stem passage of the second stem from the inside of the pressure-resistant container 11. On the other hand, during the operation in which the actuator 21 is depressed, the first stem and the second stem are depressed so that the stem passage of the first stem and the stem passage of the second stem are simultaneously in communication with the inside of the pressure-resistant container 11. The first liquid concentrate composition in the first inner bag 15A and the second liquid concentrate composition in the second inner bag 15B are then simultaneously discharged through the liquid flow paths formed by the first dip tube 16A and the second dip tube 16B. The first liquid concentrate composition and the second liquid concentrate composition discharged simultaneously in this manner reach the mixing space 23 via the stem passage relating to the first stem and the stem passage relating to the second stem, and the first actuator passage 22A and the second actuator passage 22B, respectively. The first liquid concentrate composition and the second liquid concentrate composition are mixed by the mixer 25 in the process of passing through the mixing space 23, thereby forming the chemiluminescent composition. The chemiluminescent composition thus formed is discharged from the discharge port 24A.

In the double-structure container having the configuration described above, the discharging mechanism can simultaneously discharge the first liquid concentrate composition filled in the first liquid concentrate filling space and the second liquid concentrate composition filled in the second liquid concentrate filling space. At the same time, the discharging mechanism can adjust the discharge amount of the first liquid concentrate composition from the first liquid concentrate filling space and the discharge amount of the second liquid concentrate composition from the second liquid concentrate filling space at an appropriate amount ratio, specifically, in an approximately same amount.

In the chemiluminescent aerosol product of the present invention, the mixing ratio of the first liquid concentrate composition discharged from the first liquid concentrate filling space and the second liquid concentrate composition discharged from the second liquid concentrate filling space (the mass of the first liquid concentrate composition:the mass of the second liquid concentrate composition) may preferably be 0.8:1.2 to 1.2:0.8.

In other words, the discharge amount of the first liquid concentrate composition discharged from the first liquid concentrate filling space and the discharge amount of the second liquid concentrate composition discharged from the second liquid concentrate filling space each may preferably fall within ±20% of the average value of the discharge amount of the first liquid concentrate composition and the discharge amount of the second liquid concentrate composition.

The mixing ratio (the mass of the first liquid concentrate composition:the mass of the second liquid concentrate composition) can be set to fall within the above-described range, for example, by setting the viscosity of the first liquid concentrate composition at a temperature of 20° C. to 10,000 to 200,000 mPa·s and the viscosity of the second liquid concentrate composition at a temperature of 20° C. to 10,000 to 200,000 mPa·s.

If the mixing ratio (the mass of the first liquid concentrate composition:the mass of the second liquid concentrate composition) is out of the above-described range, the difference between the discharge amount of the first liquid concentrate composition discharged from the first liquid concentrate filling space and the discharge amount of the second liquid concentrate composition discharged from the second liquid concentrate filling space becomes large. Therefore, in the chemiluminescent composition formed by mixing the first liquid concentrate composition and the second liquid concentrate composition, good luminescence performance (specifically, desired luminance and luminescence time) and self-holding action may not be obtained.

The chemiluminescent aerosol product of the present invention as described above is manufactured by filling the first liquid concentrate composition in the first liquid concentrate filling space in the double-structure container, filling the second liquid concentrate composition in the second liquid concentrate filling space, and filling the propellant in the propellant filling space.

The chemiluminescent aerosol product of the present invention includes the double-structure container provided with the discharging mechanism for simultaneously discharging the contents filled in the two liquid concentrate filling spaces, and the discharging mechanism includes the mixture discharging member having the mixer 25 for mixing the contents from the two liquid concentrate filling spaces. One of the two liquid concentrate fill spaces is filled with the first liquid concentrate composition of a specific viscosity containing an oxalic acid ester, a fluorescent substance and a thickener, and the other is filled with the second liquid concentrate composition of a specific viscosity containing hydrogen peroxide, a hydrogen peroxide decomposition catalyst and a thickener.

Therefore, since each of the first liquid concentrate composition and the second liquid concentrate composition is not exposed to the environmental atmosphere (moisture) and ultraviolet rays outside the container under any environment during storage, storage stability over an extended period of time can be obtained. Thus, storage bags and desiccants are not required for storage.

The first liquid concentrate composition and the second liquid concentrate composition can be simultaneously discharged in an appropriate amount (specifically, discharged in the same amount) from the respective two liquid concentrate filling spaces in the double-structure container. Therefore, even when the first liquid concentrate composition and the second liquid concentrate composition have high viscosity, the first liquid concentrate composition and the second liquid concentrate composition can always be discharged at a constant amount ratio, and the discharge amount of one liquid concentrate composition does not become excessive compared to the discharge amount of the other liquid concentrate composition. As a result, a discharged material having the desired composition can always be applied in the desired amount to the application site by simply operating the discharging mechanism, in particular, by discharging the first liquid concentrate composition and the second liquid concentrate composition by only one depressing operation (one push) of the actuator, for example.

Since the chemiluminescent composition obtained as a discharged material contains a thickener and has a high adhesiveness, the film body formed by the discharged material is made thick at the application site, and the shape of the film body is stably held for a long time and a stable luminescent effect can be exerted. In the film body by the discharged material, the contact speed of the oxalic acid ester, hydrogen peroxide, and the fluorescent substance is physically controlled because the fluidity of the discharged material thereinside is low. As a result, a long luminescence time is obtained.

Therefore, according to the chemiluminescent aerosol product of the present invention, a chemiluminescent composition can be easily formed in a desired amount so that the chemiluminescent composition has excellent storage stability, is stably self-held for a long period of time, and can exert a good luminescent effect.

In the chemiluminescent aerosol product of the present invention, an incombustible compressed gas is used as a propellant for the first liquid concentrate composition and the second liquid concentrate composition. Therefore, high safety can be obtained regardless of the use environment, and there is no possibility that an explosion accident occurs when the double-structure container is discarded.

In the chemiluminescent aerosol product of the present invention, a chemiluminescent composition is obtained as a discharged material by mixing the first liquid concentrate composition and the second liquid concentrate composition. Therefore, since it is unnecessary to mix the first liquid concentrate composition and the second liquid concentrate composition at the application site or the like, the chemiluminescent aerosol product can be easily applied.

The chemiluminescent aerosol product of the present invention with such a configuration can be used in a variety of use applications such as, for example, disaster products, security products, automobile accident indication products, military products, and decorative products.

EXAMPLES

A description will next be given of examples of the present invention, but the present invention is not limited to these examples.

Example 1

Preparation of First Liquid Concentrate Composition:

A first liquid concentrate composition was prepared by mixing the following components.

The viscosity of the obtained first liquid concentrate composition at a temperature of 20° C. was measured and found to be 65,000 mPa·s. The viscosity of the first liquid concentrate composition is within a range of ±20% of the average value of the viscosity thereof and the viscosity of the second liquid concentrate composition (viscosity average value).

Chemical Composition of First Liquid Concentrate Composition:

CPPO (oxalate ester): 7.59% by mass

2-EtBPEA (fluorescent substance): 0.10% by mass

Hydrophobic fumed silica (average particle size: 12 nm) (thickener): 7.41% by mass Citric acid ester (solvent): 52.49% by mass Benzyl benzoate (solvent): 32.41% by mass Preparation of Second Liquid Concentrate Composition:

A second liquid concentrate composition was prepared by mixing the following components.

The viscosity of the obtained second liquid concentrate composition at a temperature of 20° C. was measured and found to be 85,000 mPa·s. The viscosity of the second liquid concentrate composition is within a range of ±20% of the average value of the viscosity thereof and the viscosity of the first liquid concentrate composition (viscosity average value).

Chemical Composition of Second Liquid Concentrate Composition:

Hydrogen peroxide: 2.8% by mass

Sodium salicylate (hydrogen peroxide decomposition catalyst): 0.02% by mass

Hydrophilic fumed silica (average particle size: 12 nm) (thickener): 6.58% by mass Triethyl citrate (solvent): 90.6% by mass Production of Chemiluminescent Aerosol Product:

A double-structure container having the configuration illustrated in FIGS. 1 to 4 was prepared. The first liquid concentrate filling space (inside the first bag) of the double-structure container was filled with the first liquid concentrate composition, and the second liquid concentrate filling space (inside the second bag) was filled with the second liquid concentrate composition. Furthermore, the propellant filling space was filled with nitrogen gas as the propellant so that the internal pressure of the product in the double-structure container was 0.7 MPa at 25° C., thereby producing a chemiluminescent aerosol product.

Comparative Example 1

Preparation of First Liquid Concentrate Composition:

A first liquid concentrate composition was prepared by mixing the following components. The first liquid concentrate composition had the same chemical composition as that of the first liquid concentrate composition according to Example 1 except that the hydrophobic fumed silica was not added. The viscosity of the obtained first liquid concentrate composition at a temperature of 20° C. was measured and found to be less than 10,000 mPa·s.

Chemical Composition of First Liquid Concentrate Composition:

CPPO (oxalate ester): 8.2% by mass

2-EtBPEA (fluorescent substance): 0.11% by mass

Citric acid ester (solvent): 56.69% by mass

Benzyl benzoate (solvent): 35% by mass

Preparation of Second Liquid Concentrate Composition:

A second liquid concentrate composition was prepared by mixing the following components. The second liquid concentrate composition had the same chemical composition as that of the second liquid concentrate composition according to Example 1 except that the hydrophilic fumed silica was not added. The viscosity of the obtained second liquid concentrate composition at a temperature of 20° C. was measured and found to be less than 10,000 mPa·s.

Chemical Composition of Second Liquid Concentrate Composition:

Hydrogen peroxide: 3.0% by mass

Sodium salicylate (hydrogen peroxide decomposition catalyst): 0.02% by mass

Triethyl citrate (solvent): 96.98% by mass

Production of Chemiluminescent Aerosol Product:

A double-structure container having the configuration illustrated in FIGS. 1 to 4 was prepared. The first liquid concentrate filling space (inside the first bag) of the double-structure container was filled with the first liquid concentrate composition, and the second liquid concentrate filling space (inside the second bag) was filled with the second liquid concentrate composition. Furthermore, the propellant filling space was filled with nitrogen gas as the propellant so that the internal pressure of the product in the double-structure container was 0.7 MPa at 25° C., thereby producing a chemiluminescent aerosol product.

Evaluation Test:

One ml of the content of each of the chemiluminescent aerosol products produced in Example 1 and Comparative Example 1 described above was discharged onto the bottom surface of a polyethylene container, and the film thickness of the film body formed of the discharged material was confirmed. Thereafter, the container was tilted in the vertical direction and left to stand for 10 seconds, and the film body (discharged material) was then observed. The confirmation of the film thickness of the film body formed of the discharged material and the observation of the film body were performed a plurality of times.

As a result, the film body (discharged material) of the chemiluminescent aerosol product according to Example 1 had a film thickness of 2 to 4 mm, and it did not flow while maintaining its shape even after 10 seconds had elapsed since the container was tilted.

On the other hand, the film body (discharged material) of the chemiluminescent aerosol product according to Comparative Example 1 had a film thickness of not greater than 1 mm, and after 10 seconds had elapsed since the container was tilted, the shape was not maintained, and the film body flowed according to gravity.

Therefore, it was confirmed that according to the chemiluminescent aerosol product of the present invention, a chemiluminescent composition which is stably self-held for a long period of time can be formed, and a film body having a large film thickness can be formed by the chemiluminescent composition.

In addition, one ml of the content of each of the chemiluminescent aerosol products produced in Example 1 and Comparative Example 1 was discharged onto the bottom surface of a polyethylene container, and the luminescence time of the film body formed of the discharged material was confirmed. It was found that the luminescence time of the film body (discharged material) by the chemiluminescent aerosol product according to Example 1 was 3.0 hours. On the other hand, it was found that the luminescence time of the film body (discharged material) by the chemiluminescent aerosol product according to Comparative Example 1 was 2.5 hours.

Therefore, according to the chemiluminescent aerosol product of the present invention, it was confirmed that a chemiluminescent composition capable of stably exerting a luminescent effect for a long period of time could be formed.

Further, it was confirmed that the chemiluminescent aerosol product according to Example 1 could provide a discharged material (chemiluminescent composition) having good luminescence performance and self-holding action even after being stored outdoors for an extended period of time, i.e., for one month.

REFERENCE SIGNS LIST 10 double-structure container
11 pressure-resistant container
12 aerosol valve
13A first housing
13B second housing
14A, 14B stem connection
15A first inner bag
15B second inner bag
16A first dip tube
16B second dip tube
21 actuator
22A first actuator passage
22B second actuator passage
23 mixing space
24 nozzle forming member
24A discharge port
25 mixer

The invention claimed is:

1. A chemiluminescent aerosol product comprising:
a double-structure container having a propellant filling space and two independent liquid concentrate filling spaces, and provided with a discharging mechanism for simultaneously discharging contents filled in the two liquid concentrate filling spaces, wherein
the propellant filling space in the double-structure container is filled with a propellant composed of a compressed gas, a first liquid concentrate filling space of the liquid concentrate filling spaces in the double-structure container is filled with a first liquid concentrate composition, and a second liquid concentrate filling space of the liquid concentrate filling spaces in the double-structure container is filled with a second liquid concentrate composition,
the first liquid concentrate composition contains an oxalic acid ester, a fluorescent substance and a thickener, and has a viscosity of 10,000 to 200,000 mPa·s at a temperature of 20° C.,
the second liquid concentrate composition contains hydrogen peroxide, a hydrogen peroxide decomposition catalyst and a thickener, and has a viscosity of 10,000 to 200,000 mPa·s at a temperature of 20° C.,
the discharging mechanism includes a mixture discharging member having mixer for mixing the first liquid concentrate composition from the first liquid concentrate filling space and the second liquid concentrate composition from the second liquid concentrate filling space,
the first liquid concentrate composition and the second liquid concentrate composition are mixed to form a chemiluminescent composition, and
the thickener in the first liquid concentrate composition and the thickener in the second liquid concentrate composition are a fumed silica having a particle size no greater than 20 nm.

2. The chemiluminescent aerosol product according to claim 1, wherein
the first liquid concentrate composition contains 3 to 25% by mass of the oxalic acid ester, 0.1 to 0.5% by mass of the fluorescent substance, 3 to 10% by mass of the thickener and a solvent, and
the second liquid concentrate composition contains 1 to 5% by mass of the hydrogen peroxide, 0.02% by mass or less of the hydrogen peroxide decomposition catalyst, 3 to 10% by mass of the thickener and a solvent.

3. The chemiluminescent aerosol product according to claim 1, wherein
the first liquid concentrate composition and the second liquid concentrate composition each have a viscosity falling within ±20% of an average value of the viscosity of the first liquid concentrate composition and the viscosity of the second liquid concentrate composition.

4. The chemiluminescent aerosol product according to claim 1, wherein
the mixer is a static mixer.

5. The chemiluminescent aerosol product according to claim 1, wherein
the first liquid concentrate composition has a viscosity of 65,000 to 200,000 mPa·s at a temperature of 20° C., and
the second liquid concentrate composition has a viscosity of 85,000 to 200,000 mPa·s at a temperature of 20° C.

6. The chemiluminescent aerosol product according to claim 1, wherein
the fumed silica of the first liquid concentrate is hydrophobic, and
the fumed silica of the second liquid concentrate is hydrophilic.

* * * * *